United States Patent
Katayama et al.

(10) Patent No.: US 11,932,782 B2
(45) Date of Patent: Mar. 19, 2024

(54) ROOM TEMPERATURE CURABLE RESIN COMPOSITION, COATING AGENT, ADHESIVE, SEALING AGENT, AND ARTICLE

(71) Applicant: SHIN-ETSU CHEMICAL CO., LTD., Tokyo (JP)

(72) Inventors: Taiki Katayama, Annaka (JP); Tetsuro Yamada, Annaka (JP); Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 62 days.

(21) Appl. No.: 17/638,569

(22) PCT Filed: Aug. 20, 2020

(86) PCT No.: PCT/JP2020/031363
§ 371 (c)(1),
(2) Date: Feb. 25, 2022

(87) PCT Pub. No.: WO2021/039555
PCT Pub. Date: Mar. 4, 2021

(65) Prior Publication Data
US 2022/0289979 A1    Sep. 15, 2022

(30) Foreign Application Priority Data

Aug. 28, 2019   (JP) .................................. 2019-155261

(51) Int. Cl.
| | | |
|---|---|---|
| C09D 7/63 | (2018.01) | |
| C08K 5/544 | (2006.01) | |
| C08L 83/08 | (2006.01) | |
| C08L 101/10 | (2006.01) | |
| C09D 7/48 | (2018.01) | |
| C09D 7/65 | (2018.01) | |
| C09D 183/08 | (2006.01) | |
| C09D 201/10 | (2006.01) | |

(52) U.S. Cl.
CPC ............. *C09D 7/63* (2018.01); *C08K 5/544* (2013.01); *C08L 83/08* (2013.01); *C08L 101/10* (2013.01); *C09D 7/48* (2018.01); *C09D 7/65* (2018.01); *C09D 183/08* (2013.01); *C09D 201/10* (2013.01)

(58) Field of Classification Search
CPC .................................... C09D 7/48; C09D 7/65
See application file for complete search history.

(56) References Cited

U.S. PATENT DOCUMENTS

| | | |
|---|---|---|
| 4,778,838 A | 10/1988 | Greco et al. |
| 4,946,880 A | 8/1990 | Costanzi et al. |
| 2001/0036986 A1 | 11/2001 | Matsumura et al. |
| 2020/0270285 A1 | 8/2020 | Yamada et al. |

FOREIGN PATENT DOCUMENTS

| | | | |
|---|---|---|---|
| CA | 3103915 A1 | * | 12/2019 |
| DE | 42 16 923 A1 | | 11/1993 |
| JP | 62-273282 A | | 11/1987 |
| JP | 63-101389 A | | 5/1988 |
| JP | 10-510571 A | | 10/1998 |
| JP | 2961541 B2 | | 10/1999 |
| JP | 2000-336118 A | | 12/2000 |
| JP | 2001-214122 A | | 8/2001 |
| JP | 2005-112809 A | | 4/2005 |
| JP | 2018-104576 A | | 7/2018 |
| JP | 2020-132603 A | | 8/2020 |

OTHER PUBLICATIONS

Machine translation of DE 4216923 (no date).*
Hetflejš et al., "Novel stabilisers acting simultaneously as molecular-weight regulators in soluble elastomeric polyurethanes", Polymer Degradation and Stability, 2010, vol. 95, pp. 579-586.
International Search Report for PCT/JP2020/031363 dated Nov. 17, 2020.
Written Opinion of the International Searching Authority for PCT/JP2020/031363 dated Nov. 17, 2020.

* cited by examiner

Primary Examiner — Marc S Zimmer
(74) Attorney, Agent, or Firm — Birch, Stewart, Kolasch & Birch, LLP

(57) ABSTRACT

The present invention is a room temperature curable resin composition comprising: as the main agent, an organic polymer in which both molecular chain terminals are sealed by a silanol group and/or a hydrolyzable silyl group; and an organic silicon compound of a specific structure having, in a molecule, an organosiloxane structure, a hydrolyzable silyl group, and a hindered amine skeleton. This resin composition produces a cured product in which the degradation over time associated with the effects of light such as UV rays can be suppressed.

8 Claims, No Drawings

ROOM TEMPERATURE CURABLE RESIN COMPOSITION, COATING AGENT, ADHESIVE, SEALING AGENT, AND ARTICLE

TECHNICAL FIELD

The present invention relates to a room temperature curable resin composition comprising an organopolymer (base polymer) having both ends of the molecular chain blocked with a silicon group that can crosslink by forming a siloxane bond (Si—O—Si bond) using moisture (water) in the air at room temperature (hereinafter also referred to as "reactive silicon group"), and particularly relates to a room temperature curable resin composition comprising the organopolymer and an organosilicon compound having an organosiloxane structure, a hydrolyzable silyl group, and a hindered amine skeleton in the molecule, and further relates to a coating agent, an adhesive agent, and a sealing agent that include the room temperature curable resin composition, and to an article to which at least one of coating, adhesion, or sealing is applied with a cured product of the room temperature curable resin composition.

BACKGROUND ART

Organopolymers having a reactive silicon group such as a hydrolyzable silyl group typified by an alkoxysilyl group or a silanol group (Si—OH group) hydrolyze and condense (condense in a case where the reactive silicon group is a silanol group) in the presence of moisture. Organopolymers having end of the molecular chain preferably blocked with the reactive silicon group crosslink and cure in the presence of moisture, and thus can be used as a curable resin composition.

Among the organopolymers having end of the molecular chain blocked with the reactive silicon group, those having a main chain structure of a silicon-containing compound (particularly an organosiloxane) are generally known as silicone polymers (organopolysiloxanes), those having a main chain structure of a polyoxyalkylene are generally known as modified silicone polymers or silylated urethane polymers, and those having a main chain structure of a polyacrylate are generally known as silylated acrylate polymers or the like. Curable resin compositions in which these organic polymers are used are liquid at room temperature (23° C.±15° C.) and have a characteristic of curing to be a rubber elastic body. By utilizing such a characteristic, the curable resin compositions are widely used as a coating agent, an adhesive agent, a sealing agent such as a building sealant, and the like.

Meanwhile, a curable resin composition has a problem of time degradation due to the action of light such as ultraviolet rays. Such time degradation emerges in the form of deterioration of a physical property or appearance of the resin, for example, deterioration of the rubber elasticity or appearance such as cracking and whitening of the cured product.

As a countermeasure against the above-described time degradation, a hindered amine-based light stabilizer, which is known to exhibit an excellent effect of light stabilization, particularly effect of imparting weather resistance, is generally blended together with an ultraviolet absorber such as benzotriazole or benzophenone, a stabilizer such as a nickel complex, and a hindered phenol-based antioxidant such as particularly 2,6-bis(tert-butyl)-hydroxytoluene.

The hindered amine-based light stabilizer (HALS) is widely used as a resin modifier capable of suppressing time degradation of resins, particularly organic resins, due to the action of light such as ultraviolet rays and imparting weather resistance and light resistance to organic resins, and various compounds have been proposed and studied that mainly includes a 2,2,6,6-tetramethylpiperidinyl group or a 1,2,2,6,6-pentamethylpiperidinyl group.

However, curable resin compositions have been recently to have a severe weather resistance characteristic, and have a problem that the effect of a light stabilizer does not sufficiently last because a hindered amine-based light stabilizer volatilizes during long-term use and the added light stabilizer falls off due to bleed and bloom phenomena. In order to solve the above-described problems, Patent Document 1 (JP-A 2000-336118) discloses a method in which a hindered amine-based light stabilizer is directly bonded to a resin material or a polymer compound, and Patent Document 2 (JP-A 2005-112809) discloses a method in which a plurality of hindered amine-based light stabilizers are bonded in one molecule to increase the molecular weight. However, the weather resistance of these hindered amine-based light stabilizers is not sufficient, and further improvement is awaited.

Meanwhile, Patent Document 3 (JP 2961541) discloses a hindered amine-based light stabilizer into which a hydrolyzable silyl group is introduced or a silicone polymer including a hindered amino group in order to improve the weather resistance of a hindered amine-based light stabilizer. The hydrolyzable silyl group-introduced hindered amine-based light stabilizer in Patent Document 3 reacts and integrates with a resin, and therefore bleed and bloom phenomena can be suppressed in this light stabilizer more than in a conventional hindered amine-based light stabilizer. However, this light stabilizer has too high compatibility with the resin material, and therefore ultraviolet degradation on the surface of the resin material is difficult to suppress.

PRIOR ART DOCUMENTS

Patent Documents

Patent Document 1: JP-A 2000-336118
Patent Document 2: JP-A 2005-112809
Patent Document 3: JP 2961541

SUMMARY OF INVENTION

Technical Problem

The present invention has been made in view of the above-described circumstances, and an object of the present invention is to provide a room temperature curable resin composition that provides a cured product capable of suppressing time degradation due to the action of light such as ultraviolet rays, a coating agent, an adhesive agent, a sealing agent, and an article.

Solution to Problem

As a result of intensive studies to solve the above-described problems, the present inventors have found that a room temperature curable resin composition comprising an organopolymer having both ends of the molecular chain blocked with a silanol group and/or a hydrolyzable silyl group as a main component and a specific organosilicon compound having an organosiloxane structure, a hydrolyzable silyl group and a hindered amine skeleton in the molecule as a light stabilizer is preferable as a room temperature curable resin composition having high weather resistance because the room temperature curable resin composition suppresses time degradation due to the action of light such as ultraviolet rays and provides a cured product capable of exhibiting good weather resistance. Thus, the present invention has been completed.

That is, the present invention provides a room temperature curable resin composition, a coating agent, an adhesive agent, a sealing agent, an article, and the like described below.

1.

A room temperature curable resin composition comprising an organopolymer having both ends of the molecular chain blocked with a silanol group and/or a hydrolyzable silyl group as a main component, and an organosilicon compound having the average structural formula (1) described below:

[Chem. 1]

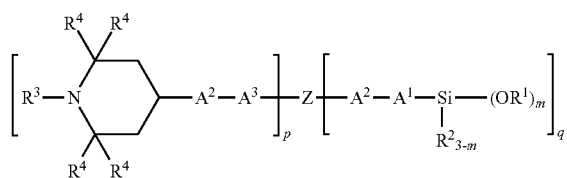

(1)

wherein Z represents a 2 to 20 valent group containing an organosiloxane structure, $R^1$ independently represents an unsubstituted or substituted alkyl group having 1 to 10 carbon atoms or represents an unsubstituted or substituted aryl group having 6 to 10 carbon atoms, $R^2$ independently represents an unsubstituted or substituted alkyl group having 1 to 10 carbon atoms or represents an unsubstituted or substituted aryl group having 6 to 10 carbon atoms, $R^3$ independently represents a hydrogen atom, an unsubstituted or substituted alkyl group having 1 to 20 carbon atoms, an unsubstituted or substituted alkoxy group having 1 to 20 carbon atoms, or an oxy radical (O·), $R^4$ independently represents a hydrogen atom or an unsubstituted or substituted alkyl group having 1 to 10 carbon atoms, $A^1$ independently represents a single bond or an unsubstituted or substituted alkylene group having 1 to 20 carbon atoms and free of a heteroatom, $A^2$ independently represents a single bond or a divalent linking group containing a heteroatom, $A^3$ independently represents an unsubstituted or substituted alkylene group having 2 to 20 carbon atoms and free of a heteroatom, m is a number of 1 to 3, p is a number of 1 to 10, q is a number of 1 to 10, and p+q corresponds to a valence of Z and satisfies 2 to 20.

2.

The room temperature curable resin composition of the item 1, comprising (A) 100 parts by weight of an organopolymer having both ends of the molecular chain blocked with a silanol group and/or a hydrolyzable silyl group, (B) 0.1 to 30 parts by weight of a hydrolyzable (organo) silane compound and/or a partial hydrolytic condensate thereof, (C) 0.001 to 20 parts by weight of a curing catalyst, and (D) 0.01 to 10 parts by weight of an organosilicon compound having the average structural formula (1).

3.

The room temperature curable resin composition of the item 1 or 2, wherein the organosilicon compound having the average structural formula (1) is an organosilicon compound having the average structural formula (2) described below:

[Chem. 2]

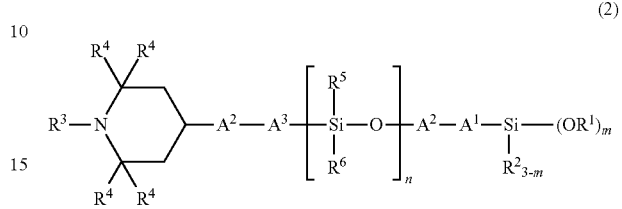

(2)

wherein $R^1$, $R^2$, $R^3$, $R^4$, $A^1$, $A^2$, $A^3$, and m represent the same meanings as described above, each of $R^5$ and $R^6$ independently represents an unsubstituted or substituted alkyl group having 1 to 20 carbon atoms or represents an aryl group having 6 to 10 carbon atoms, and n represents a number of 1 or more.

4.

The room temperature curable resin composition of the item 3, wherein the organosilicon compound having the average structural formula (2) is an organosilicon compound having the structural formula (3) and/or the structural formula (4) described below:

[Chem. 3]

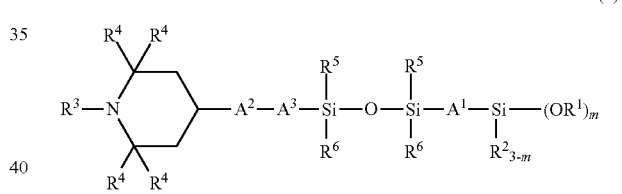

(3)

wherein $R^1$, $R^2$, $R^3$, $R^4$, $R^5$, $R^6$, $A^1$, $A^2$, $A^3$, and m represent the same meanings as described above, and

[Chem. 4]

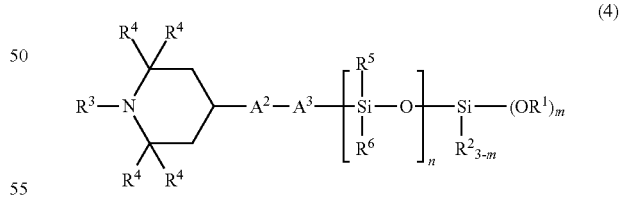

(4)

wherein $R^1$, $R^2$, $R^3$, $R^4$, $R^5$, $R^6$, $A^2$, $A^3$, m, and n represent the same meanings as described above.

5.

The room temperature curable resin composition of any one of the items 2 to 4, further comprising one or more components per 100 parts by weight of the component (A) selected from (E) 1 to 1,000 parts by weight of a filler, (F) 0.1 to 30 parts by weight of an adhesion promoter other than the component (B), and (G) 1 to 1,000 parts by weight of a plasticizer.

6.
A coating agent comprising the room temperature curable resin composition of any one of the items 1 to 5.
7.
An adhesive agent comprising the room temperature curable resin composition of any one of the items 1 to 5.
8.
A sealing agent comprising the room temperature curable resin composition of any one of the items 1 to 5.
9.
An article comprising a coating layer including a cured product of the room temperature curable resin composition of any one of the items 1 to 5.
10.
An article adhered and/or sealed with a cured product of the room temperature curable resin composition of any one of the items 1 to 5.

Advantageous Effects of Invention

The room temperature curable resin composition of the present invention comprises an organosiloxane-modified hindered amine-based light stabilizer having a specific molecular structure having an organosiloxane structure, a highly reactive hydrolyzable silyl group, and a hindered amine skeleton in the molecule, and thus has characteristics of being more excellent in weather resistance and crack resistance than a room temperature curable resin composition to which a conventional hindered amine-based light stabilizer is added. The room temperature curable resin composition of the present invention having such characteristics can be preferably used in a coating agent, an adhesive agent, a sealing agent, and the like.

DESCRIPTION OF EMBODIMENTS

Hereinafter, the present invention is specifically described.

The room temperature curable resin composition of the present invention comprises an organopolymer having both ends of the molecular chain blocked with a silanol group and/or a hydrolyzable silyl group as a main component, and an organosilicon compound having the average structural formula (1) described below:

[Chem. 5]

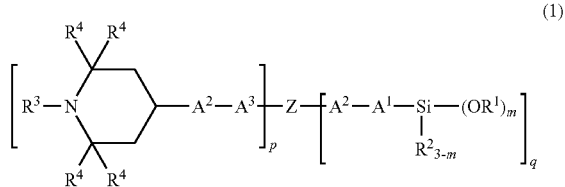

(1)

wherein Z represents a 2 to 20 valent group containing an organosiloxane structure, $R^1$ independently represents an unsubstituted or substituted alkyl group having 1 to 10 carbon atoms or represents an unsubstituted or substituted aryl group having 6 to 10 carbon atoms, $R^2$ independently represents an unsubstituted or substituted alkyl group having 1 to 10 carbon atoms or represents an unsubstituted or substituted aryl group having 6 to 10 carbon atoms, $R^3$ independently represents a hydrogen atom, an unsubstituted or substituted alkyl group having 1 to 20 carbon atoms, an unsubstituted or substituted alkoxy group having 1 to 20 carbon atoms, or an oxy radical (O·), $R^4$ independently represents a hydrogen atom or an unsubstituted or substituted alkyl group having 1 to 10 carbon atoms, $A^1$ independently represents a single bond or an unsubstituted or substituted alkylene group having 1 to 20 carbon atoms and free of a heteroatom, $A^2$ independently represents a single bond or a divalent linking group containing a heteroatom, $A^3$ independently represents an unsubstituted or substituted alkylene group having 2 to 20 carbon atoms and free of a heteroatom, m is a number of 1 to 3, p is a number of 1 to 10, q is a number of 1 to 10, and p+q corresponds to a valence of Z and satisfies 2 to 20.

The room temperature curable resin composition of the present invention preferably comprises the following components (A) to (D):
(A) an organopolymer having both ends of the molecular chain blocked with a silanol group and/or a hydrolyzable silyl group,
(B) a hydrolyzable (organo)silane compound and/or a partial hydrolytic condensate thereof,
(C) a curing catalyst, and
(D) an organosilicon compound having the average structural formula (1).

Hereinafter, each of components is described.
Component (A):
The component (A) used in the present invention is an organopolymer having both ends of the molecular chain blocked with a silanol group (hydroxyl group bonded to a silicon atom) and/or a hydrolyzable silyl group, and acts as a main component (base polymer) in the room temperature curable resin composition of the present invention. Such a base polymer is preferably a modified silicone polymer, a silylated urethane polymer, a silylated acrylate polymer, or a silicone polymer.

The modified silicone polymer to be used is specifically a polyether-modified silicone polymer having both ends of the molecular chain blocked with a silanol group and/or a hydrolyzable silyl group, such as polypropylene oxide, polyethylene oxide, or propylene oxide-ethylene oxide copolymer having both ends of the molecular chain blocked with a silanol group and/or a hydrolyzable silyl group (such as an alkoxysilyl group). From the viewpoint of availability, the modified silicone polymer is particularly preferably a polypropylene oxide copolymer including, as a main chain, a polypropylene oxide having both ends of the molecular chain blocked with a hydrolyzable silyl group. The polypropylene oxide copolymer has a numerical average molecular weight of 5,000 to 50,000, preferably 10,000 to 40,000, and more preferably 15,000 to 35,000. Examples of the modified silicone polymer such as a polyether-modified silicone polymer include a series of polymers of Kaneka MS Polymer (S203, S203H, S303, and S303H) manufactured by KANEKA CORPORATION, and a series of polymers of EXCESTAR (ES-S2410, ES-S2420, ES-S3430, and ES-S3630) manufactured by AGC Inc.

In the present invention, the molecular weight (or the degree of polymerization) can be determined as, for example, the numerical average molecular weight (or the numerical average degree of polymerization) or the weight average molecular weight (or the weight average degree of polymerization) as measured versus polystyrene standards in gel permeation chromatography (GPC) analysis using tetrahydrofuran (THF), toluene, or the like as a developing solvent (the same applies below).

The silylated urethane polymer is specifically a polymer that has a main chain including polypropylene oxide, polyethylene oxide, propylene oxide-ethylene oxide copolymer, or the like, has a structure of a urethane bond reaction with isocyanate in a part of the main chain structure, and has a structure of both ends of the molecular chain blocked with a silanol group and/or a hydrolyzable silyl group.

The silylated acrylate polymer to be used is specifically a silylated acrylate polymer having both ends of the molecular chain blocked with a silanol group and/or a hydrolyzable silyl group, such as polyacrylate or polymethacrylate having both ends of the molecular chain blocked with a silanol group and/or a hydrolyzable silyl group. From the viewpoint of availability, the silylated acrylate polymer is particularly preferably a polyacrylate copolymer including, as a main chain, a polyacrylate having both ends of the molecular chain blocked with a hydrolyzable silyl group. Examples of such a silylated acrylate polymer include KANEKA XMAP and Kaneka TA Polymer manufactured by KANEKA CORPORATION.

The silicone polymer to be used is specifically a diorganopolysiloxane having both ends of the molecular chain blocked with a silanol group and/or a hydrolyzable silyl group, represented by the following general formula (I) or (II):

[Chem. 6]

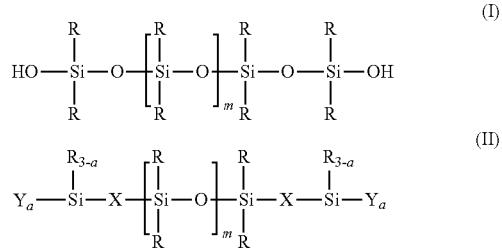

wherein R is an unsubstituted or substituted monovalent hydrocarbon group having 1 to 12 and preferably 1 to 8 carbon atoms, X is an oxygen atom or a divalent hydrocarbon group having 1 to 8 and preferably 1 to 6 carbon atoms (for example, an alkylene group), Y is a hydrolyzable group, a is 2 or 3, and m is a number such that the diorganopolysiloxane has a viscosity of 100 to 1,000,000 mPa·s at 23° C.

Examples of the unsubstituted or substituted monovalent hydrocarbon group as R in the general formulae (I) and (II) include alkyl groups such as a methyl group, an ethyl group, a propyl group, an isopropyl group, a butyl group, an isobutyl group, a tert-butyl group, a pentyl group, a hexyl group, a heptyl group, an octyl group, a nonyl group, a decyl group, and an octadecyl group, cycloalkyl groups such as a cyclopentyl group and a cyclohexyl group, alkenyl groups such as a vinyl group, an allyl group, a butenyl group, a pentenyl group, and a hexenyl group, aryl groups such as a phenyl group, a tolyl group, a xylyl group, an α-naphthyl group, and a β-naphthyl group, aralkyl groups such as a benzyl group, a 2-phenylethyl group, and a 3-phenylpropyl group, and groups in which some or all of the hydrogen atoms in the above-described groups are substituted with a halogen atom such as F, Cl, or Br, a cyano group, or the like, such as a 3-chloropropyl group, a 3,3,3-trifluoropropyl group, and a 2-cyanoethyl group. Among the groups, a methyl group, an ethyl group, and a phenyl group are preferable, and a methyl group is particularly preferable.

X is an oxygen atom or a divalent hydrocarbon group having 1 to 8 carbon atoms, and the divalent hydrocarbon group is preferably an alkylene group represented by —$(CH_2)_q$— (q represents an integer of 1 to 8). X is particularly preferably an oxygen atom or —$CH_2CH_2$—.

Y is a hydrolyzable group at end of the molecular chain of the diorganopolysiloxane, and examples of the hydrolyzable group include alkoxy groups having 1 to 10 carbon atoms such as a methoxy group, an ethoxy group and a propoxy group, alkoxyalkoxy groups having 2 to 10 carbon atoms such as a methoxyethoxy group, an ethoxyethoxy group and a methoxypropoxy group, acyloxy groups having 1 to 10 carbon atoms such as an acetoxy group, an octanoyloxy group and a benzoyloxy group, alkenyloxy groups having 2 to 10 carbon atoms such as a vinyloxy group, an isopropenyloxy group and a 1-ethyl-2-methylvinyloxy group, ketoxime groups having 3 to 8 carbon atoms such as a dimethylketoxime group, a methylethylketoxime group and a diethylketoxime group, substituted amino groups having 2 to 6 carbon atoms such as a dimethylamino group, a diethylamino group, a butylamino group and a cyclohexylamino group, aminoxy groups having 2 to 6 carbon atoms such as a dimethylaminoxy group and a diethylaminoxy group, and substituted amide groups having 3 to 8 carbon atoms such as an N-methylacetamide group, an N-ethylacetamide group and an N-methylbenzamide group. Among these hydrolyzable groups, the alkoxy groups are preferable, a methoxy group and an ethoxy group are more preferable, and a methoxy group is particularly preferable.

In the general formulae (I) and (II), m representing the number of the repeated difunctional diorganopolysiloxane units (($R)_2SiO_{2/2}$) included in the main chain (or degree of polymerization) is a number such that the diorganopolysiloxane has a viscosity of 100 to 1,000,000 mPa·s at 23° C., and is usually an integer of about 20 to 2,000, preferably 22 to 1,600, more preferably 23 to 1,000, and still more preferably 24 to 500.

Here, the viscosity of the diorganopolysiloxane at 23° C. is preferably 100 to 1,000,000 mPa·s, more preferably 300 to 500,000 mPa·s, and particularly preferably 500 to 100,000 mPa·s, in particular 1,000 to 80,000 mPa·s. The viscosity is a value obtained with a rotational viscometer (for example, BL type, BH type, BS type, or cone plate type rotational viscometer) (the same applies below).

The organopolymers as the component (A) having both ends of the molecular chain blocked with a silanol group and/or a hydrolyzable silyl group can be used alone or, as necessary, in admixture of two or more different in structure or degree of polymerization.

In the room temperature curable resin composition of the present invention, the content of the organopolymer, which is a main component, having both ends of the molecular chain blocked with a silanol group and/or a hydrolyzable silyl group is not particularly limited, but the content in the composition is preferably about 1 to 99 wt %, more preferably about 30 to 90 wt %, and still more preferably about 45 to 65 wt %.

Component (B):

The hydrolyzable (organo)silane compound and/or a partial hydrolytic condensate thereof, which is the component (B) used in the present invention, is a component that acts as a crosslinker (curing agent), and examples of the component include (organo)silane compounds having three or more and preferably three or four hydrolyzable groups such as alkoxy groups in the molecule, and partial hydrolytic condensates thereof (that is, (organo)siloxane oligomers having three or more remaining hydrolyzable groups in the molecule, obtained by partial hydrolysis condensation of the (organo)silane compounds).

Examples of the hydrolyzable group include ketoxime groups, alkoxy groups, an acetoxy group, an isopropenoxy group and the like, alkoxy groups are preferable, and a methoxy group is particularly preferable.

Here, examples of the ketoxime groups, the alkoxy groups, and the acetoxy group can be the same as the above-described ketoxime groups, alkoxy groups, and acetoxy group that exemplify Y in the general formula (II).

Examples of the group, other than the hydrolyzable group, bonded to a silicon atom (organo group) include unsubstituted or halogen-substituted monovalent hydrocarbon groups having 1 to 12 and preferably 1 to 8 carbon atoms and free of a hetero atom such as a nitrogen atom, an oxygen atom, or a sulfur atom, and specifically include alkyl groups such as a methyl group, an ethyl group, a propyl group, an isopropyl group, a butyl group, an isobutyl group, a tert-butyl group, a pentyl group, a hexyl group, a heptyl group, an octyl group, a nonyl group, a decyl group, and an octadecyl group, cycloalkyl groups such as a cyclopentyl group and a cyclohexyl group, alkenyl groups such as a vinyl group, an allyl group, a butenyl group, a pentenyl group, and a hexenyl group, aryl groups such as a phenyl group, a tolyl group, a xylyl group, an α-naphthyl group, and a β-naphthyl group, aralkyl groups such as a benzyl group, a 2-phenylethyl group, and a 3-phenylpropyl group, and groups in which some or all of the hydrogen atoms in the above-described groups are substituted with a halogen atom such as F, Cl, or Br, such as a 3-chloropropyl group and a 3,3,3-trifluoropropyl group. Among these groups, a methyl group and a vinyl group are preferable.

Specific examples of the component (B) include tetraalkoxysilanes such as tetramethoxysilane, tetraethoxysilane, methyl silicate, and ethyl silicate, and partial hydrolytic condensates of the tetraalkoxysilanes; trifunctional hydrolyzable (organo)silane compounds such as organotrialkoxysilanes such as methyltrimethoxysilane, methyltriethoxysilane, vinyltrimethoxysilane, vinyltriethoxysilane, vinyltriisopropoxysilane, methyltris(methoxyethoxy)silane, and vinyltris(methoxyethoxy)silane, organotrialkenyloxysilanes such as methyltripropenoxysilane, vinyltriisopropenoxysilane, and phenyltriisopropenoxysilane, organotriacyloxysilanes such as methyltriacetoxysilane and vinyltriacetoxysilane, and partial hydrolytic condensates of the trifunctional hydrolyzable (organo)silane compounds; and methyltrimethoxysilane and vinyltrimethoxysilane are particularly preferably used. However, the component (B) is not limited to these compounds and condensates. These compounds and condensates may be used alone or in admixture of two or more.

The hydrolyzable (organo)silane compound and/or a partial hydrolytic condensate thereof, which is the component (B), is free of a monovalent hydrocarbon group, other than the hydrolyzable group, including a functional group having a hetero atom such as a nitrogen atom, an oxygen atom, or a sulfur atom in the molecule. In this point, the hydrolyzable (organo)silane compound and/or a partial hydrolytic condensate thereof is clearly distinguished from the adhesion promoter (carbon functional silane or silane coupling agent) as the component (F) described below.

The compounding amount of the component (B) is preferably 0.1 to 30 parts by weight, and particularly preferably 0.5 to 30 parts by weight, in particular 1 to 10 parts by weight per 100 parts by weight of the component (A). If the compounding amount is less than 0.1 parts by weight, the cured product of the present composition is poor in mechanical strength, and if the compounding amount is more than 30 parts by weight, the mechanical property of rubber to be obtained also deteriorates, and a problem of economic disadvantage occurs.

Component (C):

The component (C) used in the present invention is a curing catalyst (a nonmetallic organic catalyst and/or a metallic catalyst), and acts to promote curing of the room temperature curable resin composition of the present invention.

The nonmetallic organic catalyst as the curing catalyst to be used can be a known curing promoter of a room temperature curable resin composition, and is not particularly limited. Examples of the nonmetallic organic catalyst include phosphazene-containing compounds such as N,N,N',N',N'',N''-hexamethyl-N'''-(trimethylsilylmethyl)-phosphoramidic triamide, amine compounds such as hexylamine and dodecylamine phosphate and salts thereof, quaternary ammonium salts such as benzyltriethylammonium acetate, dialkylhydroxylamines such as dimethylhydroxylamine and diethylhydroxylamine, and silanes and siloxanes including a guanidyl group, such as tetramethylguanidylpropyltrimethoxysilane, tetramethylguanidylpropylmethyldimethoxysilane, and tetramethylguanidylpropyltris(trimethylsiloxy)silane, but the nonmetallic organic catalyst is not limited thereto. The nonmetallic organic catalysts may be used alone or in admixture of two or more.

The metallic catalyst as the curing catalyst to be used can be a known curing promoter of a room temperature curable resin composition, and is not particularly limited. Examples of the metallic catalyst include alkyltin ester compounds such as dibutyltin diacetate, dibutyltin dilaurate, dibutyltin dioctoate, dibutyltin bis(acetylacetonate), dioctyltin dineodecanoate, and di-n-butyl-dimethoxy tin, titanate esters and titanium chelate compounds such as tetraisopropoxytitanium, tetra-n-butoxytitanium, tetrakis(2-ethylhexoxy)titanium, dipropoxybis(acetylacetonate)titanium, and titanium isopropoxyoctylene glycol, alcoholate aluminum compounds such as zinc naphthenate, zinc stearate, zinc-2-ethyloctoate, iron-2-ethylhexoate, cobalt-2-ethylhexoate, manganese-2-ethylhexoate, cobalt naphthenate, aluminum isopropylate, and aluminum secondary butyrate, aluminum chelate compounds such as aluminum alkylacetate-diisopropylate and aluminum bisethylacetoacetate monoacetylacetonate, organic metal compounds such as bismuth(III) neodecanoate, bismuth(III) 2-ethylhexanoate, bismuth(III) citrate, and bismuth octylate, and lower fatty acid salts of an alkali metal, such as potassium acetate, sodium acetate, and lithium oxalate, but the metallic catalyst is not limited thereto. The metallic catalysts may be used alone or in admixture of two or more.

The compounding amount of the curing catalyst as the component (C) is 0.001 to 20 parts by weight, and preferably 0.01 to 10 parts by weight per 100 parts by weight of the component (A). If the compounding amount of the component (C) is too small, a sufficient curing property cannot be obtained, and if the compounding amount is too large, the obtained curing property causes too fast curing, resulting in insufficient working time and economic disadvantage.

Component (D):

The room temperature curable resin composition of the present invention includes the organosilicon compound (D) as a light stabilizer to suppress time degradation due to the action of light such as ultraviolet rays. The organic silicon compound (D) has the following average structural formula (1) and has an organosiloxane structure, a hydrolyzable silyl group, and a hindered amine skeleton in the molecule.

[Chem. 7]

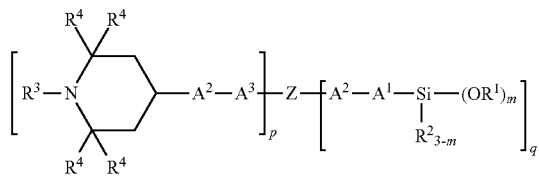

(1)

Here, each of $R^1$ and $R^2$ independently represents an unsubstituted or substituted alkyl group having 1 to 10 carbon atoms or represents an unsubstituted or substituted aryl group having 6 to 10 carbon atoms. $R^1$ and $R^2$ are preferably an alkyl group having 1 to 3 carbon atoms from the viewpoints of weather resistance and crack resistance. The alkyl group having 1 to 10 carbon atoms may be linear, cyclic, or branched, and is preferably a linear alkyl group.

Specific examples of the alkyl group having 1 to 10 carbon atoms include a methyl group, an ethyl group, an n-propyl group, an n-butyl group, an n-pentyl group, an n-hexyl group, an n-heptyl group, an n-octyl group, an n-nonyl group, and an n-decyl group. Among these groups, a methyl group, an n-propyl group, an n-hexyl group, and an n-octyl group are preferable, and a methyl group is more preferable.

Specific examples of the aryl group having 6 to 10 carbon atoms include a phenyl group and a naphthyl group, and a phenyl group is preferable.

$R^3$ independently represents a hydrogen atom, an unsubstituted or substituted alkyl group having 1 to 20 carbon atoms, an unsubstituted or substituted alkoxy group having 1 to 20 carbon atoms, or an oxy radical (O).

$R^3$ is preferably a hydrogen atom or an alkyl group having 1 to 3 carbon atoms from the viewpoints of weather resistance and crack resistance. The alkyl group having 1 to 20 carbon atoms may be linear, cyclic, or branched, and is preferably a linear alkyl group.

Specific examples of the alkyl group having 1 to 20 carbon atoms include a methyl group, an ethyl group, an n-propyl group, an n-butyl group, an n-pentyl group, an n-hexyl group, an n-heptyl group, an n-octyl group, an n-nonyl group, an n-decyl group, an undecyl group, a dodecyl group, and an icosyl group. Among these groups, a methyl group and an n-propyl group are preferable, and a methyl group is more preferable.

The alkyl group in the alkoxy group having 1 to 20 carbon atoms may be linear, cyclic, or branched.

Specific examples of the alkoxy group having 1 to 20 carbon atoms include a methoxy group, an ethoxy group, an n-propoxy group, an n-butoxy group, an n-pentoxy group, an n-hexoxy group, an n-heptoxy group, an n-octoxy group, an n-nonyloxy group, an n-decyloxy group, an undecyloxy group, a dodecyloxy group, and an icosyloxy group. Among these groups, a methoxy group and an ethoxy group are preferable, and a methoxy group is more preferable.

$R^4$ independently represents a hydrogen atom or an unsubstituted or substituted alkyl group having 1 to 10 carbon atoms. Examples of the alkyl group can be the same as the above-described alkyl groups that exemplify $R^1$, and among the alkyl groups, a methyl group, an n-propyl group, an n-hexyl group, and an n-octyl group are preferable, and a methyl group is more preferable.

Some or all of the hydrogen atoms in the alkyl groups, the aryl groups, and the alkoxy groups in $R^1$ to $R^4$ may be substituted with an alkyl group having 1 to 10 carbon atoms, a halogen atom such as F, Cl, or Br, a cyano group, or the like. Specific examples of such a substituted group include a 3-chloropropyl group, a 3,3,3-trifluoropropyl group, a 2-cyanoethyl group, a tolyl group, and a xylyl group, and a 3,3,3-trifluoropropyl group is preferable from the viewpoints of weather resistance and crack resistance.

$A^1$ independently represents a single bond or an unsubstituted or substituted alkylene group having 1 to 20 carbon atoms and free of a heteroatom.

The alkylene group, $A^1$, having 1 to 20 carbon atoms and free of a hetero atom may be linear, cyclic, or branched, and specific examples of the alkylene group include alkylene groups such as a methylene group, an ethylene group, a trimethylene group, a propylene group, an isopropylene group, a tetramethylene group, an isobutylene group, a pentamethylene group, a hexamethylene group, a heptamethylene group, an octamethylene group, a nonamethylene group, a decamethylene group, an undecamethylene group, a dodecamethylene group, a tridecamethylene group, a tetradecamethylene group, a pentadecamethylene group, a hexadecamethylene group, a heptadecamethylene group, an octadecamethylene group, a nonadecamethylene group, and an eicosadecylene group; and cycloalkylene groups such as a cyclopentylene group and a cyclohexylene group.

Among the groups, $A^1$ is preferably a single bond, an ethylene group, a trimethylene group, or an octamethylene group, and more preferably a single bond, an ethylene group, or a trimethylene group.

Some or all of the hydrogen atoms in the alkylene group as $A^1$ may be substituted with an aryl group having 6 to 20 carbon atoms such as a phenyl group.

$A^2$ independently represents a single bond or a divalent linking group containing a heteroatom.

Specific examples of the divalent linking group, $A^2$, containing a hetero atom include an ether bond (—O—), a thioether bond (—S—), an amino bond (—NH—), a sulfonyl bond (—S(=O)$_2$—), a phosphinyl bond (—P(=O)OH—), an oxo bond (—C(=O)—), a thioxo bond (—C(=S)—), an ester bond (—C(=O)O—), a thioester bond (—C(=O)S—), a thionoester bond (—C(=S)O—), a dithioester bond (—C(=S)S—), a carbonate ester bond (—OC(=O)O—), thiocarbonic ester bond (—OC(=S)O—), an amide bond (—C(=O)NH—), a thioamide bond (—C(=S)NH—), a urethane bond (—OC(=O)NH—), a thiourethane bond (—SC(=O)NH—), a thionourethane bond (—OC(=S)NH—), a dithiourethane bond (—SC(=S)NH—), a urea bond (—NHC(=O)NH—), a thiourea bond (—NHC(=S)NH—), and a silicon bond (—SiR$^5$R$^6$—, $R^5$ and $R^6$ represent the same meanings as $R^5$ and $R^6$ described below).

Among the groups, $A^2$ is preferably a single bond, an ether bond (—O—), or a silicon bond (—SiR$^5$R$^6$—).

The group including $A^1$, $A^2$, and Z is free of a combination of oxygen atoms forming a structure "—O—O—" in series and free of a combination of silicon atoms forming a structure "—Si—Si—" in series.

$A^3$ independently represents an unsubstituted or substituted alkylene group having 2 to 20 carbon atoms and free of a heteroatom.

The alkylene group, $A^3$, having 2 to 20 carbon atoms and free of a hetero atom may be linear, cyclic, or branched, and specific examples include alkylene groups such as an ethylene group, a trimethylene group, a propylene group, an isopropylene group, a tetramethylene group, an isobutylene group, a pentamethylene group, a hexamethylene group, a heptamethylene group, an octamethylene group, a nonamethylene group, a decamethylene group, an undecamethylene group, a dodecamethylene group, a tridecamethylene group, a tetradecamethylene group, a pentadecamethylene group, a hexadecamethylene group, a heptadecamethylene group, an octadecamethylene group, a nonadecamethylene group, and an eicosadecylene group; and cycloalkylene groups such as a cyclopentylene group and a cyclohexylene group.

Among the groups, $A^3$ is preferably an ethylene group, a trimethylene group, a tetramethylene group, or an octamethylene group, and more preferably a trimethylene group, a tetramethylene group, or an octamethylene group.

m is a number of 1 to 3, and is preferably 2 to 3 and more preferably 3 from the viewpoints of weather resistance and crack resistance.

p is a number of 1 to 10, q is a number of 1 to 10, and p+q corresponds to the valence of Z and represents a value satisfying 2 to 20.

p is preferably 1 to 5, more preferably 1 to 2, and still more preferably 1 from the viewpoints of weather resistance and crack resistance.

q is preferably 1 to 5, more preferably 1 to 2, and still more preferably 1 from the viewpoints of weather resistance and crack resistance.

Therefore, p+q is preferably 2 to 10, more preferably 2 to 4, and still more preferably 2 from the viewpoints of weather resistance and crack resistance.

Z represents a 2 to 20 valent, preferably 2 to 10 valent, more preferably 2 to 4 valent, and still more preferably divalent group containing an organosiloxane structure.

Z is not particularly limited as long as it is a group containing an organosiloxane structure, and may contain a linear structure, a branched structure, or a crosslinked structure.

More specifically, the organosiloxane structure is, for example, an organo(poly)siloxane structure containing a D unit ($R^5R^6SiO_{2/2}$ unit), a T unit ($R^1SiO_{3/2}$ unit), and/or a Q unit ($SiO_{4/2}$ unit) ($R^1$ represents the same meanings as described above, and $R^5$ and $R^6$ are the same as in the formula (2) described below).

These units may be contained singly (the D unit, the T unit, and the Q unit may be contained singly) or may form a combination of a plurality of units.

In particular from the viewpoints of weather resistance and crack resistance, an organopolysiloxane structure containing the D units is preferable, and a divalent organopolysiloxane structure containing the single D units is more preferable.

Therefore, the organosilicon compound as the component (D) preferably has an average structural formula of the following formula (2), and by using such a compound, further good weather resistance and further good crack resistance are exhibited.

[Chem. 8]

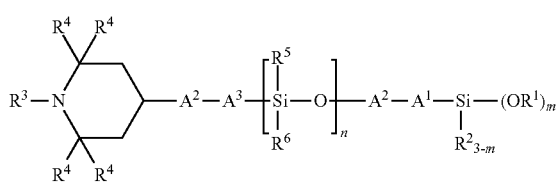

(2)

In the formula (2), $R^1$ to $R^4$, $A^1$, $A^2$, $A^3$, and m represent the same meanings as described above, and each of $R^5$ and $R^6$ independently represents an unsubstituted or substituted alkyl group having 1 to 20 carbon atoms or represents an aryl group having 6 to 10 carbon atoms, and n represents a number of 1 or more.

In the formula (2), each of $R^5$ and $R^6$ independently represents an unsubstituted or substituted alkyl group having 1 to 20 carbon atoms or represents an aryl group having 6 to 10 carbon atoms, and examples of the alkyl group and the aryl group include the same as the above-described groups that exemplify $R^3$ and $R^1$.

In particular from the viewpoints of weather resistance and crack resistance, $R^5$ and $R^6$ are preferably an alkyl group having 1 to 3 carbon atoms, and more preferably a methyl group.

n represents a number of 1 or more, and from the viewpoints of weather resistance and crack resistance, the number is preferably 1 to 1,000, more preferably 1 to 100, still more preferably 1 to 50, and still even more preferably 1 to 35.

The weight average molecular weight of the organosilicon compound as the component (D) is not particularly limited, and in consideration of imparting sufficient weather resistance and sufficient crack resistance to a cured product obtained by curing a curable composition containing the compound, the weight average molecular weight is preferably 400 to 100,000, more preferably 400 to 10,000, still more preferably 400 to 5,000, and still even more preferably 400 to 3,000.

The organosilicon compound as the component (D) particularly preferably has the following structural formula (3) or (4), and by using such an organic silicon compound, the weather resistance and the crack resistance are further improved.

[Chem. 9]

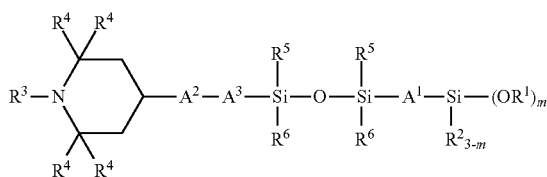

(3)

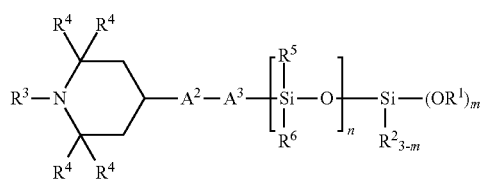

(4)

In the formulae (3) and (4), $R^1$ to $R^6$, $A^1$, $A^2$, $A^3$, m, and n represent the same meanings as described above.

Specific examples of the organosilicon compound as the component (D) can include the following compounds.

[Chem. 10]

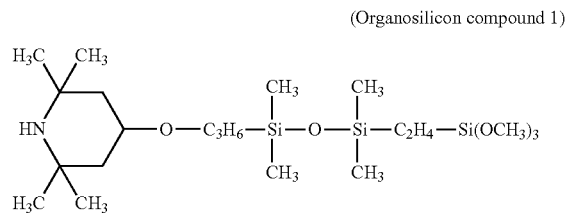
(Organosilicon compound 1)

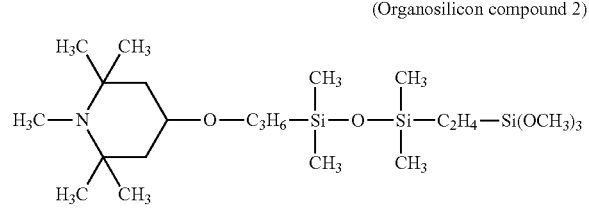
(Organosilicon compound 2)

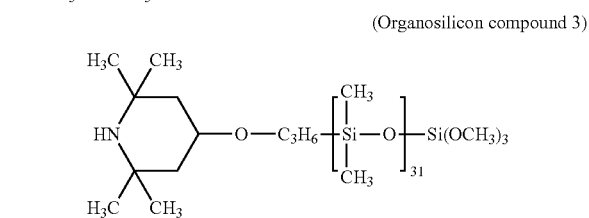
(Organosilicon compound 3)

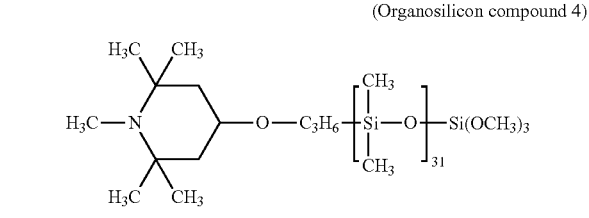
(Organosilicon compound 4)

[Chem. 11]

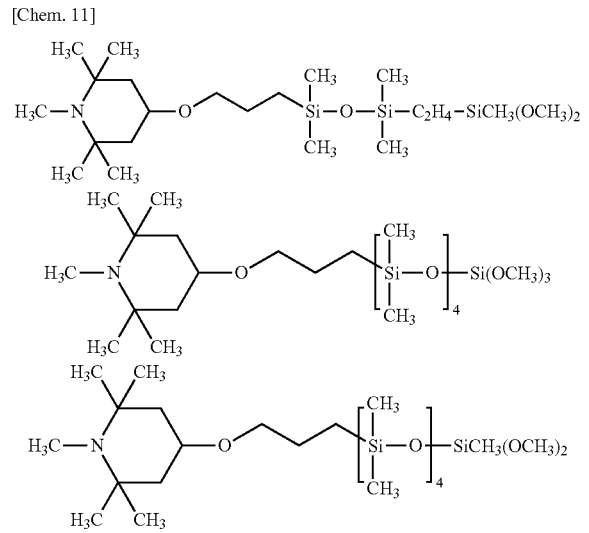

The organosilicon compound having the above-described formula (1) can be produced with a conventionally known method.

For example, the organosilicon compound having the above-described formula (2) can be obtained by reacting an amine compound having an alkenyl group and represented by the structural formula (5) described below with a silane compound having an organosiloxane structure and represented by the average structural formula (6).

More specifically, the alkenyl group in the amine compound (5) having an alkenyl group and the hydrosilyl group (Si—H group) in the silane compound (6) having an organosiloxane structure are subjected to a hydrosilylation reaction in the presence of a platinum compound-containing catalyst to add the hydrosilyl group to the alkenyl group, and thus a carbon-silicon bond is formed.

[Chem. 12]

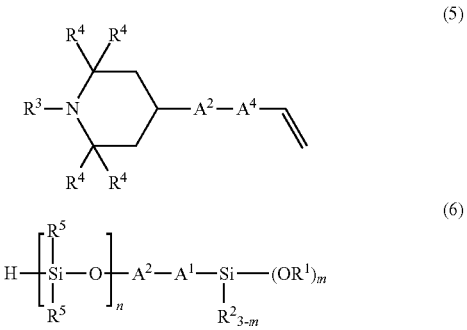

In the structural formulae (5) and (6), $R^1$ to $R^6$, $A^1$, $A^2$, m, and n represent the same meanings as described above. $A^4$ represents a single bond or an unsubstituted or substituted alkylene group having 1 to 18 carbon atoms and free of a heteroatom.

In the structural formula (5), $A^4$ represents a single bond or an unsubstituted or substituted alkylene group having 1 to 18 carbon atoms and free of a heteroatom. The alkylene group, $A^4$, having 1 to 18 carbon atoms and free of a hetero atom may be linear, cyclic, or branched, and specific examples include alkylene groups such as a methylene group, an ethylene group, a trimethylene group, a propylene group, an isopropylene group, a tetramethylene group, an isobutylene group, a pentamethylene group, a hexamethylene group, a heptamethylene group, an octamethylene group, a nonamethylene group, a decamethylene group, an undecamethylene group, a dodecamethylene group, a tridecamethylene group, a tetradecamethylene group, a pentadecamethylene group, a hexadecamethylene group, a heptadecamethylene group, and an octadecamethylene group; and cycloalkylene groups such as a cyclopentylene group and a cyclohexylene group. Among the groups, $A^4$ is preferably a methylene group, an ethylene group, or a hexamethylene group.

Specific examples of the amine compound having an alkenyl group and represented by the structural formula (5) include compounds having the following structural formulae, but are not limited thereto.

[Chem. 13]

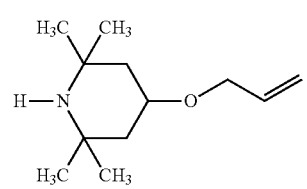

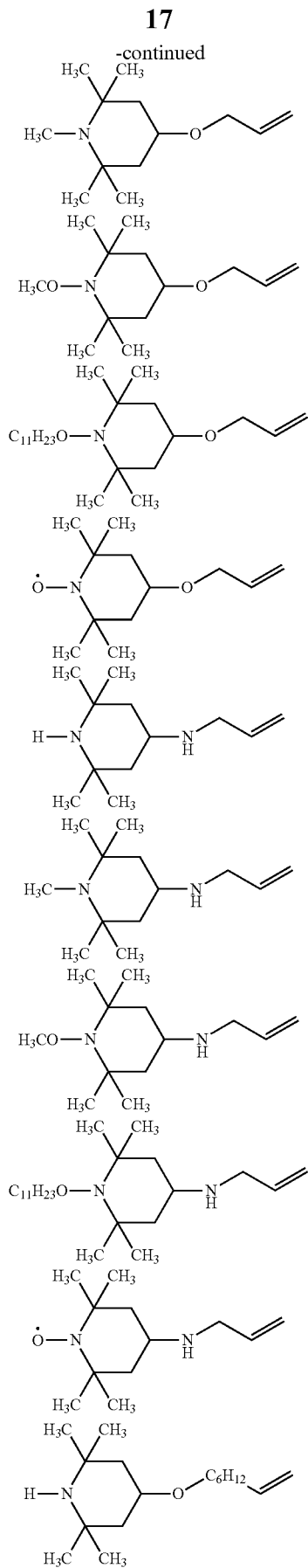
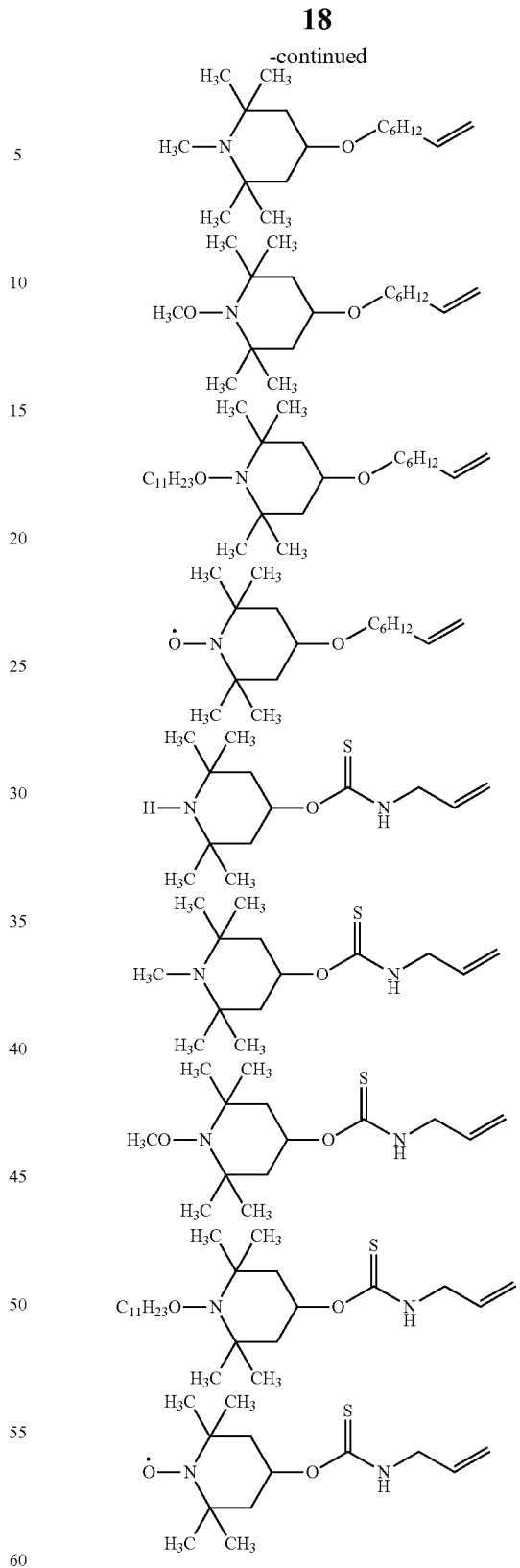
Specific examples of the silane compound having an organosiloxane structure and represented by the average structural formula (6) include compounds having the following structural formulae, but are not limited thereto. The number of repeated siloxane units in a parenthesis represents the average number, and in a case where a plurality of different siloxane units are included, the siloxane units in parentheses may be arranged in any order.
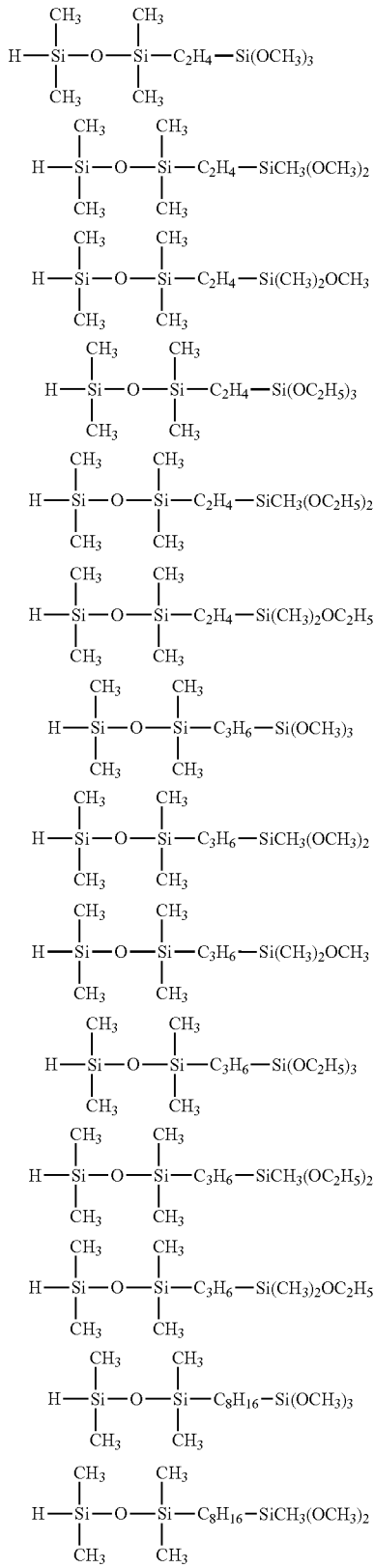
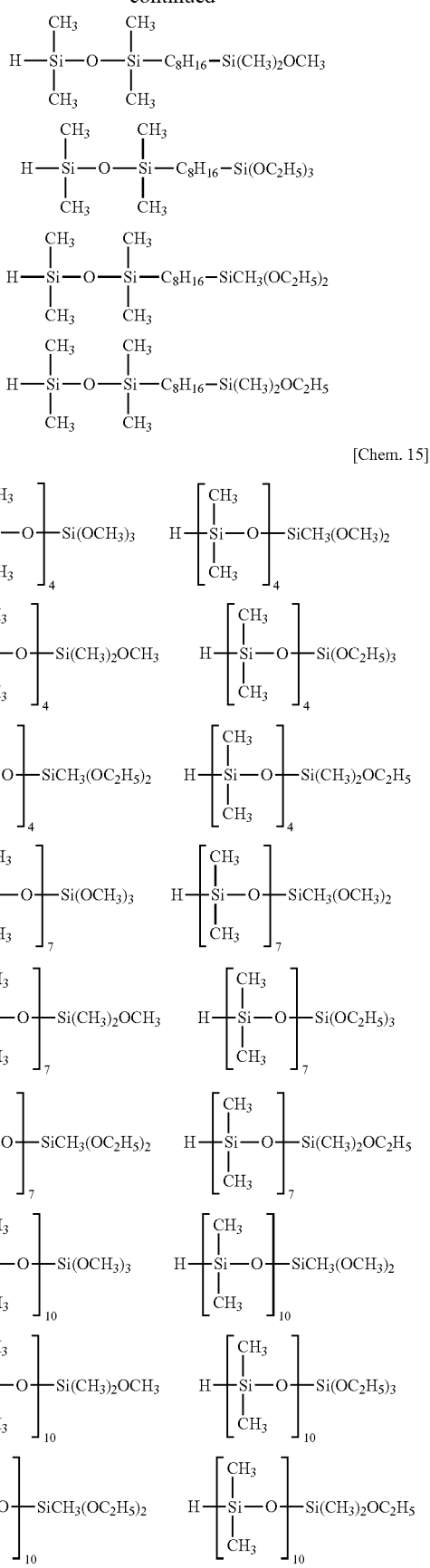

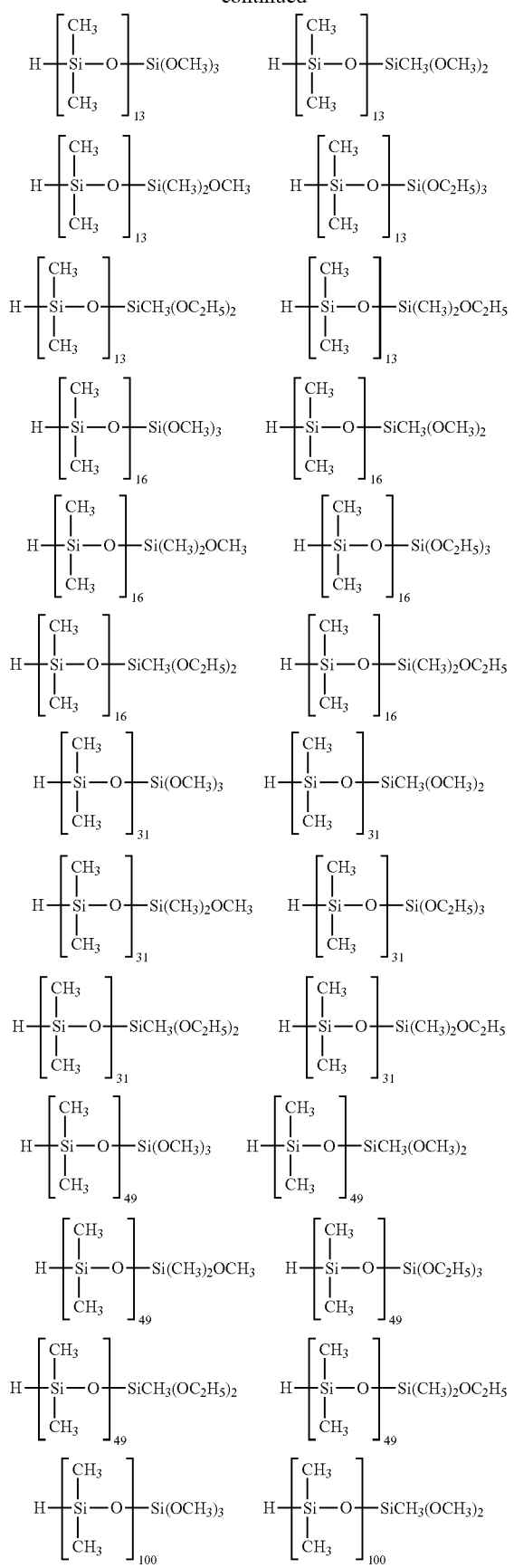
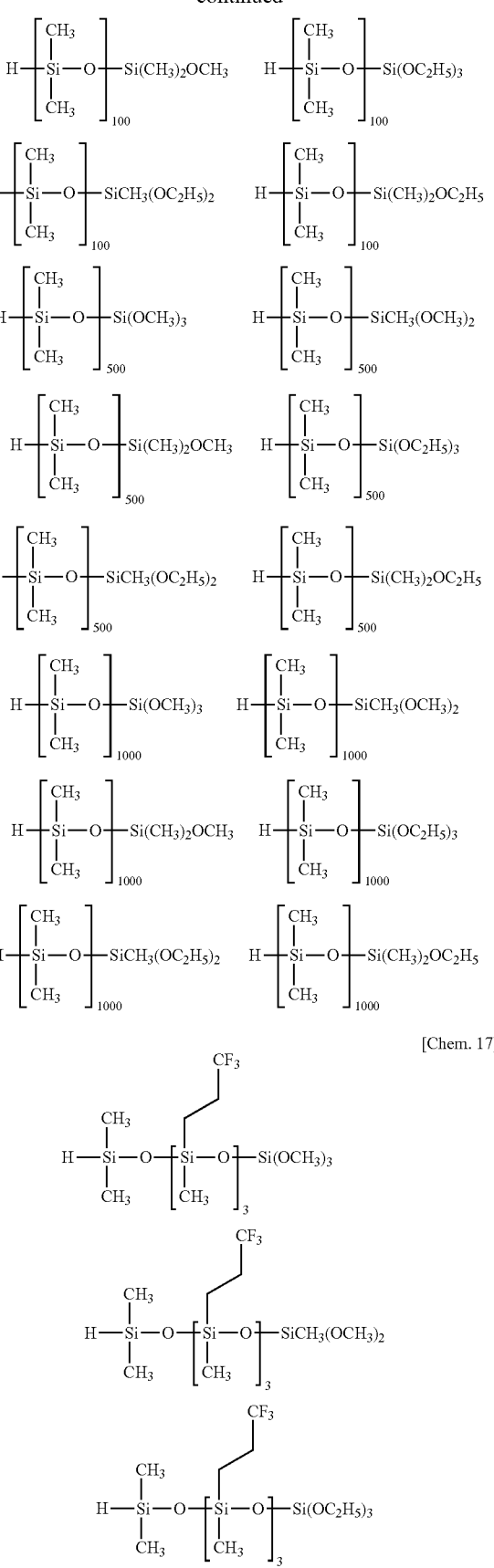

-continued

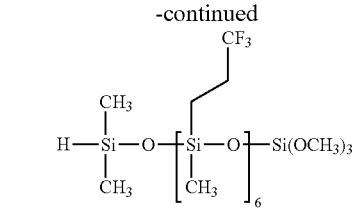
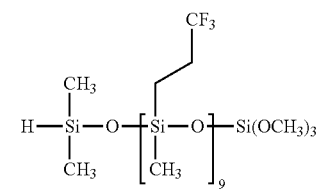
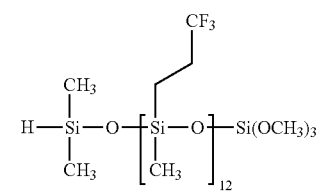
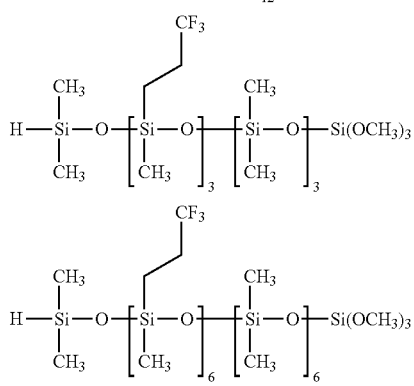
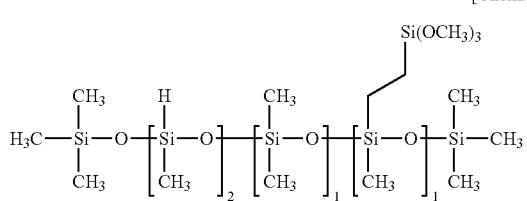
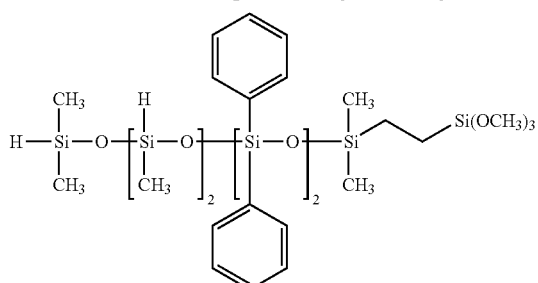

[Chem. 18]

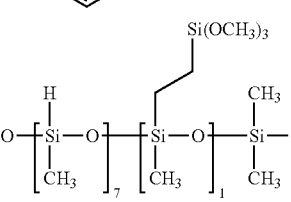

-continued

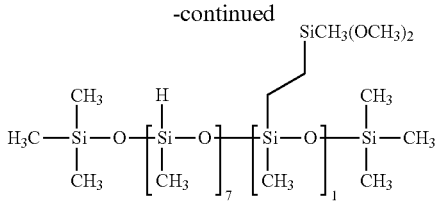

The platinum compound-containing catalyst used for the hydrosilylation is not particularly limited, and specific examples of the catalyst include chloroplatinic acid, alcohol solutions of chloroplatinic acid, a toluene solution and a xylene solution of platinum-1,3-divinyl-1,1,3,3-tetramethyl-disiloxane complex, tetrakistriphenylphosphine platinum, dichlorobistriphenylphosphine platinum, dichlorobisacetonitrile platinum, dichlorobisbenzonitrile platinum, dichlorocyclooctadiene platinum, and supported catalysts such as platinum-carbon, platinum-alumina, and platinum-silica.

Among the catalysts, zero-valent platinum complexes are preferable, and a toluene solution and a xylene solution of platinum-1,3-divinyl-1,1,3,3-tetramethyldisiloxane complex are more preferable from the viewpoint of selectivity.

The amount of the platinum compound-containing catalyst used is not particularly limited, and from the viewpoints of reactivity and productivity, the amount of the contained platinum atoms is preferably $1 \times 10^{-7}$ to $1 \times 10^{-2}$ mol, and more preferably $1 \times 10^{-7}$ to $1 \times 10^{-3}$ mol per 1 mol of the amine compound having an alkenyl group and represented by the structural formula (5).

In addition, a co-catalyst may be used for improving the reactivity in the hydrosilylation. As the co-catalyst, a co-catalyst generally used for hydrosilylation can be used, but in the present invention, ammonium salts of an inorganic acid, acid amide compounds, and carboxylic acids are preferable.

Specific examples of the ammonium salts of an inorganic acid include ammonium chloride, ammonium sulfate, ammonium amidosulfate, ammonium nitrate, ammonium dihydrogen phosphate, diammonium hydrogen phosphate, triammonium phosphate, ammonium hypophosphite, ammonium carbonate, ammonium hydrogen carbonate, ammonium sulfide, ammonium borate, and ammonium borofluoride. Among the salts, the ammonium salts of an inorganic acid having a pKa of 2 or more are preferable, and ammonium carbonate and ammonium hydrogen carbonate are more preferable.

Specific examples of the acid amide compounds include formamide, acetamide, N-methylacetamide, N,N-dimethylacetamide, propionamide, acrylamide, malonamide, succinamide, maleamide, fumaramide, benzamide, phthalamide, palmitic acid amide, and stearic acid amide. Among the compounds, formamide and stearic acid amide are preferable, and formamide is more preferable.

Specific examples of the carboxylic acids include formic acid, acetic acid, propionic acid, butyric acid, methoxyacetic acid, pentanoic acid, caproic acid, heptanoic acid, octanoic acid, lactic acid, glycolic acid, trifluoroacetic acid, maleic acid, fumaric acid, succinic acid, tartaric acid, and oxalic acid. Among the carboxylic acids, formic acid, acetic acid, lactic acid, maleic acid, fumaric acid, succinic acid, and trifluoroacetic acid are preferable, and acetic acid and trifluoroacetic acid are more preferable.

The amount of the co-catalyst used is not particularly limited, and from the viewpoints of reactivity, selectivity, cost, and the like, the amount is preferably $1\times10^{-5}$ to $1\times10^{-1}$ mol, and more preferably $1\times10^{-4}$ to $5\times10^{-1}$ mol per 1 mol of the amine compound having an alkenyl group and represented by the structural formula (5).

Although the hydrosilylation reaction proceeds without a solvent, a solvent can be used.

Specific examples of the usable solvent include hydrocarbon-based solvents such as pentane, hexane, cyclohexane, heptane, isooctane, benzene, toluene, and xylene, ether-based solvents such as diethyl ether, tetrahydrofuran, and dioxane, ester-based solvents such as ethyl acetate and butyl acetate, aprotic polar solvents such as N,N-dimethylformamide, and chlorinated hydrocarbon-based solvents such as dichloromethane and chloroform. These solvents may be used alone or in admixture of two or more.

The reaction temperature in the hydrosilylation reaction is not particularly limited. The hydrosilylation reaction can be performed from 0° C. under heating, and the reaction temperature is preferably 0 to 200° C.

In order to obtain an appropriate reaction rate, the hydrosilylation reaction is preferably performed under heating, and from such a viewpoint, the reaction temperature is more preferably 40 to 110° C., and still more preferably 40 to 90° C.

The reaction time also is not particularly limited, and is usually about 1 to 60 hours, preferably 1 to 30 hours, and more preferably 1 to 20 hours.

In consideration of suppressing a byproduct during the hydrosilylation reaction and improving the storage stability and the characteristic of the resulting organic silicon compound, the reaction ratio of the alkenyl group in the amine compound (5) having an alkenyl group to the hydrosilyl group in the silane compound (6) having an organosiloxane structure is preferably set so that the amount of the alkenyl group is 0.8 to 1.3 mol, and more preferably 0.9 to 1.2 mol per 1 mol of the hydrosilyl group.

The room temperature curable resin composition of the present invention comprises at least one organosilicon compound having the average structural formula (1) described above (hereinafter, referred to as organosilicon compound (1)).

The organosilicon compound (1) can be used alone as a light stabilizer, but it can also be used as light stabilizer composition in which an additive such as a stabilizer and an optional component such as a solvent are appropriately mixed.

In this composition, the content of the organosilicon compound (1) is not particularly limited, and can be appropriately set to, for example, 90 wt % or more, 70 wt % or more, 50 wt % or more, 30 wt % or more, 10 wt % or more, 5 wt % or more, or 1 wt % or more.

The organosilicon compound (1) comprised in the room temperature curable resin composition of the present invention is derived from the structure of the organic silicon compound, and as compared with a conventional light stabilizer, it improves the weather resistance and the crack resistance of the cured product obtained by using the room temperature curable resin composition comprising the organosilicon compound (1).

In the room temperature curable resin composition of the present invention, the content of the organosilicon compound (1) is not particularly limited, and is preferably about 0.1 to 10 wt % and more preferably 0.5 to 5 wt % in the composition. In a case where the light stabilizer contains a solvent, the above-described content means the nonvolatile content excluding the solvent.

The compounding amount of the component (D) in the room temperature curable resin composition of the present invention comprising at least the components (A) to (D) is 0.01 to 10 parts by weight, preferably 0.05 to 7.5 parts by weight, and more preferably 0.1 to 5 parts by weight per 100 parts by weight of the component (A). If the compounding amount is too small, the cured product of the present composition has poor weather resistance, and if the compounding amount is too large, poor curing or economic disadvantage occurs.

Component (E):

A component (E) is a filler (inorganic filler and/or organic resin filler), and is an optional component blended in the room temperature curable resin composition of the present invention as necessary. The component (E) is used to impart sufficient mechanical strength to a cured product including the composition. A the filler, known fillers can be used, for example, fine powder silica, fumed silica, precipitated silica, silicas whose surface are hydrophobized with an organosilicon compound, glass beads, glass balloons, transparent resin beads, silica aerogel, diatomaceous earth, metal oxides such as iron oxide, zinc oxide, titanium oxide and fumed metal oxides, wet silica or its surface treated one with silane, quartz powder, carbon black, talc, reinforcers such as zeolite and bentonite, metal carbonates such as asbestos, glass fibers, carbon fibers, calcium carbonate, magnesium carbonate and zinc carbonate, glass wool, fine powder mica, fused silica powder, and synthetic resin powder such as polystyrene, polyvinyl chloride and polypropylene. Among these fillers, inorganic fillers such as silica, calcium carbonate and zeolite are preferable, and fumed silica whose surface is hydrophobized and calcium carbonate are particularly preferable. These fillers may be used alone or in admixture of two or more.

In a case where the filler as the component (E) is blended, the compounding amount of the component (E) is preferably 1 to 1,000 parts by weight and particularly preferably 5 to 400 parts by weight per 100 parts by weight of the component (A). The mechanical strength of the cured product obtained from this composition tends to be more sufficient in the case of blending the component (E) than in the case of blending no component (E).

If more than 1,000 parts by weight of the component (E) is used, the workability deteriorates due to increase in the viscosity of the composition, and in addition, the rubber elasticity tends to be difficult to obtain due to decrease in the rubber strength after curing.

Component (F):

The component (F) is an adhesion promoter other than the component (B), and is an optional component blended in the room temperature curable resin composition of the present invention as necessary. The component (F) is used to impart a sufficient adhesive property to a cured product including the composition. Specifically, a hydrolyzable organosilane compound having a monovalent hydrocarbon group, other than a hydrolyzable group, including a functional group having a hetero atom such as a nitrogen atom, an oxygen atom, or a sulfur atom (provided that a guanidyl group is excluded) in the molecule (so-called carbon functional silane or silane coupling agent) or the like is preferably blended, and examples of the hydrolyzable organosilane compound include aminosilanes such as γ-aminopropyltriethoxysilane and 3-2-(aminoethylamino)propyltrimethoxysilane, epoxysilanes such as γ-glycidoxypropyltrimethoxysilane and β-(3,4-epoxycyclohexyl)ethyltrimethoxysilane, (meth)acrylic silanes such as γ-(meth)acryloxypropyltrimethoxysilane and γ-(meth)acryloxypropyltriethoxysilane, mercaptosilanes such as γ-mercaptopropyltrimethoxysilane, and isocyanate silanes such as γ-isocyanatepropyltrimethoxysilane. The adhesion promoter as the component (F) has a monovalent hydrocarbon group, other than a hydrolyzable group, including a functional group having a hetero atom such as a nitrogen atom, an oxygen atom, or a sulfur atom. In this point, the adhesion promoter is clearly distinguished from the hydrolyzable (organo)silane compound and/or a partial hydrolytic condensate thereof as the component (B) described above.

In a case where the adhesion promoter as the component (F) is blended, the compounding amount of the component (F) is preferably 0.1 to 30 parts by weight and particularly preferably 0.5 to 20 parts by weight per 100 parts by weight of the component (A). If the compounding amount is more than 30 parts by weight, the curing property may be insufficient, or economic disadvantage may occur.

Component (G):

A component (G) is a plasticizer, and is an optional component blended in the room temperature curable resin composition of the present invention as necessary. The component (G) can adjust the viscosity to achieve good handleability without impairing the mechanical property and the flame retardancy of a cured product including the composition.

Examples of the plasticizer used in the room temperature curable resin composition of the present invention include dimethyl phthalate (DMP), diethyl phthalate (DEP), di-n-butyl phthalate (DBP), diheptyl phthalate (DHP), dioctyl phthalate (DOP), diisononyl phthalate (DINP), diisodecyl phthalate (DIDP), ditridecyl phthalate (DTDP), butylbenzyl phthalate (BBP), dicyclohexyl phthalate (DCHP), tetrahydrophthalates, dioctyl adipate (DOA), diisononyl adipate (DINA), diisodecyl adipate (DIDA), di-n-alkyl adipate, dibutyl diglycol adipate (BXA), bis(2-ethylhexyl) azelate (DOZ), dibutyl sebacate (DBS), dioctyl sebacate (DOS), dibutyl maleate (DBM), di-2-ethylhexyl maleate (DOM), dibutyl fumarate (DBF), tricresyl phosphate (TCP), triethyl phosphate (TEP), tributyl phosphate (TBP), tris(2-ethylhexyl) phosphate (TOP), tri(chloroethyl) phosphate (TCEP), trisdichloropropyl phosphate (CPP), tributoxyethyl phosphate (TBXP), tris(β-chloropropyl) phosphate (TMCPP), triphenyl phosphate (TPP), octyl diphenyl phosphate (ODP), acetyl triethyl citrate, and acetyl tributyl citrate, and in addition, trimellitic acid-based plasticizers, polyester-based plasticizers, chlorinated paraffin, stearic acid-based plasticizers, silicone oils (nonfunctional organopolysiloxanes) such as dimethylpolysiloxane, and recently, petroleum-based high-boiling point solvents such as polyoxypropylene glycol-based, paraffin-based, naphthene-based, and isoparaffin-based solvents. These plasticizers are used alone or in admixture of two or more.

In a case where the component (G) is blended, the compounding amount is preferably 1 to 1,000 parts by weight, more preferably 2 to 500 parts by weight, and still more preferably 5 to 200 parts by weight per 100 parts by weight of the component (A). The amount of the component (G) is preferably within the above-described range because such an amount of the component (G) can adjust the viscosity to achieve good handleability without impairing the mechanical property and the flame retardancy of the room temperature curable resin composition of the present invention.

[Other Components]

In the room temperature curable resin composition of the present invention, known additives such as a pigment, a dye, an anti-aging agent, an antioxidant, an antistatic agent, and a flame retardant such as antimony oxide or chlorinated paraffin can be blended as additives as long as an object of the present invention is not impaired. Furthermore, a thixotropy improver, an antifungal agent, and an antibacterial agent can be blended.

Furthermore, in the room temperature curable resin composition of the present invention, an organosolvent may be used as necessary. Examples of the organosolvent include aliphatic hydrocarbon-based compounds such as n-hexane, n-heptane, isooctane and isododecane, aromatic hydrocarbon-based compounds such as toluene and xylene, chain siloxanes such as hexamethyldisiloxane, octamethyltrisiloxane, decamethyltetrasiloxane, dodecamethylpentasiloxane and 2-(trimethylsiloxy)-1,1,1,2,3,3,3-heptamethyltrisiloxane, and cyclic siloxanes such as octamethylcyclopentasiloxane and decamethylcyclopentasiloxane. The amount of the organosolvent is to be appropriately adjusted within a range such that an effect of the present invention is not impaired.

The room temperature curable resin composition of the present invention can be obtained by uniformly mixing the above-described components, and in addition, predetermined amounts of the above-described additives in a dry atmosphere. The room temperature curable resin composition of the present invention cures when left to stand at room temperature, and can employ a known method and condition according to the kind of the composition as the molding method, the curing condition, and the like.

The obtained cured product exhibits good flexibility and has rubber elasticity. Therefore, the cured product is useful as a coating agent, an adhesive agent and a sealing agent (such as a building sealant). The method of using the room temperature curable resin composition of the present invention as a coating agent, an adhesive agent or a sealing agent is to be in accordance with a conventionally known method of use, and is not particularly limited.

Examples of the article in which a coating layer including a cured product of the room temperature curable resin composition of the present invention is formed include articles including glass, articles including a resin, and articles including a metal, and the material and the shape of the substrate are not particularly limited.

Examples of the article adhered and/or sealed with a cured product of the room temperature curable resin composition of the present invention include articles including glass and articles including a metal, and the material and the shape of the substrate are not particularly limited.

EXAMPLES

Hereinafter, the present invention is specifically described with reference to Synthesis Examples, Examples, and Comparative Examples, but the present invention is not limited to the following Examples. In the following specific Examples, the term "part" means "part by weight". The viscosity of each product is a value measured at 23° C. with an Ostwald viscometer, and the molecular weight is a weight average molecular weight as measured versus polystyrene standards by gel permeation chromatography (GPC). The silicone average composition of each product was calculated from the integrated values of spectra detected by $^1$H-NMR and $^{29}$Si-NMR using a 300 MHz-NMR measuring instrument manufactured by JEOL Ltd.

[Synthesis Example 1] Synthesis of Organosilicon Compound 1

In a 300 mL separable flask equipped with a stirrer, a reflux condenser, a dropping funnel, and a thermometer, 65.0 g of an amine compound having an alkenyl group of the formula (7) described below and 0.58 g of a toluene solution of platinum-1,3-divinyl-1,1,3,3-tetramethyldisiloxane complex ($5.0\times10^{-5}$ mol of a platinum atom per 1 mol of the amine compound having an alkenyl group) were put and heated to 80° C. To the resulting mixture, 83.8 g of a silane compound having an organosiloxane structure of the formula (8) described below was added dropwise, and the mixture was heated and stirred at 80° C. for 2 hours. $^1$H-NMR measurement was performed to confirm complete disappearance of peaks derived from the alkenyl group and the hydrosilyl group in the raw material, and thus completion of the reaction was determined. The mixture after the completion of the reaction was distilled under reduced pressure (80° C., 5 mmHg) for 1 hour, and the resulting residue was filtered to obtain 148 g of the corresponding organosilicon compound 1.

The obtained organosilicon compound 1 was a pale yellow transparent liquid, and had a viscosity of 13 mm$^2$/s, a weight average molecular weight of 480, and the formula (9) described below.

[Chem. 19]

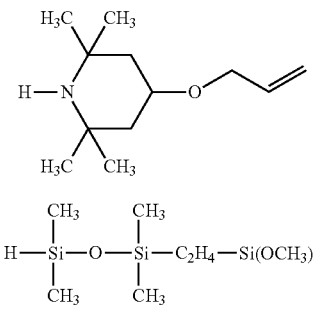
(7)

(8)

[Chem. 20]

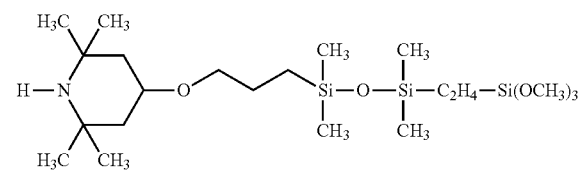
(9)

[Synthesis Example 2] Synthesis of Organosilicon Compound 2

In a 300 mL separable flask equipped with a stirrer, a reflux condenser, a dropping funnel, and a thermometer, 69.6 g of an amine compound having an alkenyl group of the formula (10) described below and 0.58 g of a toluene solution of platinum-1,3-divinyl-1,1,3,3-tetramethyldisiloxane complex ($5.0\times10^{-5}$ mol of a platinum atom per 1 mol of the amine compound having an alkenyl group) were put and heated to 80° C. To the resulting mixture, 83.8 g of a silane compound having an organosiloxane structure of the formula (8) described above was added dropwise, and the mixture was heated and stirred at 80° C. for 2 hours. $^1$H-NMR measurement was performed to confirm complete disappearance of peaks derived from the alkenyl group and the hydrosilyl group in the raw material, and thus completion of the reaction was determined. The mixture after the completion of the reaction was distilled under reduced pressure (80° C., 5 mmHg) for 1 hour, and the resulting residue was filtered to obtain 152 g of the corresponding organosilicon compound 2.

The obtained organosilicon compound 2 was a yellow transparent liquid, and had a viscosity of 15 mm$^2$/s, a weight average molecular weight of 490, and the formula (11) described below.

[Chem. 21]

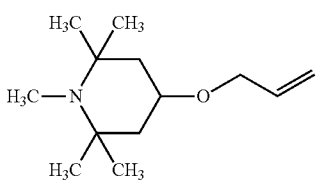
(10)

[Chem. 22]

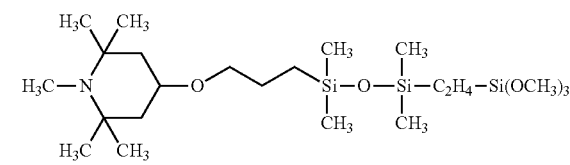
(11)

[Synthesis Example 3] Synthesis of Organosilicon Compound 3

Synthesis was performed in the same manner as in Synthesis Example 1 except that 83.8 g of the silane compound having an organosiloxane structure of the formula (8) described above was changed to 717.9 g of a silane compound having an organopolysiloxane structure of the average structural formula (12) described below, and the 300 mL separable flask was changed to a 1 L separable flask to obtain 775 g of the corresponding organic silicon compound 3.

The obtained organosilicon compound 3 was a pale yellow transparent liquid, and had a viscosity of 165 mm$^2$/s, a weight average molecular weight of 2,590, and the average structural formula (13) described below.

[Chem. 23]

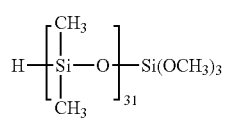
(12)

[Chem. 24]

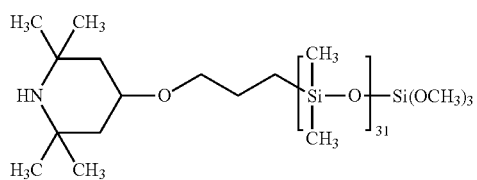
(13)

[Synthesis Example 4] Synthesis of Organosilicon Compound 4

Synthesis was performed in the same manner as in Synthesis Example 2 except that 83.8 g of the silane compound having an organosiloxane structure of the formula (8) described above was changed to 717.9 g of a silane compound having an organopolysiloxane structure of the average structural formula (12) described above, and the 300 mL separable flask was changed to a 1 L separable flask to obtain 780 g of the corresponding organic silicon compound 4.

The obtained organosilicon compound 4 was a pale yellow transparent liquid, and had a viscosity of 150 mm$^2$/s, a weight average molecular weight of 2,630, and the average structural formula (14) described below.

[Chem. 25]

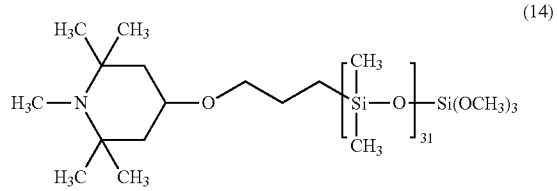

(14)

Example 1

Under a reduced pressure condition, 100 parts of MS POLYMER S303H (a polyoxypropylene polymer having both ends of the molecular chain blocked with a methyldimethoxysilyl group, numerical average molecular weight: about 17,000, manufactured by Kaneka Corporation), 60 parts of CARLEX300 (light calcium carbonate, manufactured by Maruo Calcium Co., Ltd.), and 40 parts of MC COAT P-20 (ground calcium carbonate, manufactured by Maruo Calcium Co., Ltd.) were mixed until the mixture became uniform. Next, 2 parts of vinyltrimethoxysilane, 1 part of NEOSTANN U-220H (a dibutyltin-based curing catalyst, manufactured by Nitto Kasei Co., Ltd.), and 1 part of the organic silicon compound 1 obtained in Synthesis Example 1 were mixed under a moisture-free condition until the mixture became uniform to prepare a composition 1.

Example 2

A composition 2 was prepared in the same manner as in Example 1 described above except that the organosilicon compound 1 was changed to the organosilicon compound 2 obtained in Synthesis Example 2.

Example 3

A composition 3 was prepared in the same manner as in Example 1 described above except that the organosilicon compound 1 was changed to the organosilicon compound 3 obtained in Synthesis Example 3.

Example 4

A composition 4 was prepared in the same manner as in Example 1 described above except that the organosilicon compound 1 was changed to the organosilicon compound 4 obtained in Synthesis Example 4.

Comparative Example 1

A composition 5 was prepared in the same manner as in Example 1 described above except that the organosilicon compound 1 was not added.

Comparative Example 2

A composition 6 was prepared in the same manner as in Example 1 described above except that the organosilicon compound 1 was changed to TINUVIN 765 (a hindered amine compound free of an organosiloxane structure and free of a hydrolyzable silyl group in the molecule, manufactured by BASF Japan Ltd.) as a generally used ultraviolet absorber.

Comparative Example 3

A composition 7 was prepared in the same manner as in Example 1 described above except that the organosilicon compound 1 was changed to TINUVIN 770 DF (a hindered amine compound free of an organosiloxane structure and free of a hydrolyzable silyl group in the molecule, manufactured by BASF Japan Ltd.) as a generally used ultraviolet absorber.

[Evaluation Test]

Each of the compositions 1 to 7 prepared in Examples 1 to 4 and Comparative Examples 1 to 3 was extruded into a sheet having a thickness of 2 mm and left in the air at 23° C. and 50% RH for 7 days to obtain a cured product. Next, the obtained cured product was exposed to a weather meter test condition using an open flame carbon arc lamp in accordance with WS-A specified in Table 1 of JIS A 1415, and the time until the cured product broke due to growth of a surface crack was confirmed up to an exposure time of 2,000 hours. In a case where the cured product did not break after exposure for 2,000 hours in the test, the result was recorded as "O".

Table 1 shows the results together with the compounding amount of each composition.

TABLE 1

|  |  | Example |  |  |  | Comparative Example |  |  |
|---|---|---|---|---|---|---|---|---|
|  |  | 1 | 2 | 3 | 4 | 1 | 2 | 3 |
| Composition (pbw) | MS POLYMER S303H | 100 | 100 | 100 | 100 | 100 | 100 | 100 |
|  | CARLEX300 | 60 | 60 | 60 | 60 | 60 | 60 | 60 |
|  | MC COAT P-20 | 40 | 40 | 40 | 40 | 40 | 40 | 40 |
|  | Vinyltrimethoxysilane | 2 | 2 | 2 | 2 | 2 | 2 | 2 |
|  | NEOSTANN U-220H | 1 | 1 | 1 | 1 | 1 | 1 | 1 |
|  | Organosilicon compound 1 | 1 |  |  |  |  |  |  |
|  | Organosilicon compound 2 |  | 1 |  |  |  |  |  |

TABLE 1-continued

|  |  | Example | | | | Comparative Example | | |
|---|---|---|---|---|---|---|---|---|
|  |  | 1 | 2 | 3 | 4 | 1 | 2 | 3 |
|  | Organosilicon compound 3 |  |  | 1 |  |  |  |  |
|  | Organosilicon compound 4 |  |  |  | 1 |  |  |  |
|  | TINUVIN 765 |  |  |  |  |  | 1 |  |
|  | TINUVIN 770 DF |  |  |  |  |  |  | 1 |
| Evaluation | Time until break under weather meter exposure | ○ | ○ | ○ | ○ | 500 | 1000 | 1000 |

As shown in Table 1, it can be seen that the compositions in Examples 1 to 4 in which the organosilicon compounds 1 to 4 were used as a light stabilizer respectively has higher crack resistance and higher weather resistance than the compositions in Comparative Example 1 in which no light stabilizer was used and Comparative Examples 2 and 3 in which a generally used light stabilizer was used.

As described above, by using the specific organosilicon compound, a room temperature curable resin composition can be obtained that is excellent in weather resistance and crack resistance that are difficult to achieve with a conventional light stabilizer.

The invention claimed is:

1. A room temperature curable resin composition comprising
   an organopolymer having both ends of the molecular chain blocked with a silanol group and/or a hydrolyzable silyl group as a main component, and
   an organosilicon compound having the structural formula (3) described below:

[Chem. 3]

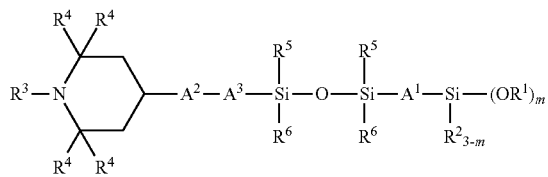

(3)

wherein $R^1$ independently represents an unsubstituted or substituted alkyl group having 1 to 10 carbon atoms or represents an unsubstituted or substituted aryl group having 6 to 10 carbon atoms, $R^2$ independently represents an unsubstituted or substituted alkyl group having 1 to 10 carbon atoms or represents an unsubstituted or substituted aryl group having 6 to 10 carbon atoms, $R^3$ independently represents a hydrogen atom, an unsubstituted or substituted alkyl group having 1 to 20 carbon atoms, an unsubstituted or substituted alkoxy group having 1 to 20 carbon atoms, or an oxy radical (O·), $R^4$ independently represents a hydrogen atom or an unsubstituted or substituted alkyl group having 1 to 10 carbon atoms, each of $R^5$ and $R^6$ independently represents an unsubstituted or substituted alkyl group having 1 to 20 carbon atoms or represents an aryl group having 6 to 10 carbon atoms, $A^1$ independently represents an unsubstituted or substituted alkylene group having 1 to 20 carbon atoms and free of a heteroatom, $A^2$ independently represents a single bond or a divalent linking group containing a heteroatom, $A^3$ independently represents an unsubstituted or substituted alkylene group having 2 to 20 carbon atoms and free of a heteroatom, and m is a number of 1 to 3.

2. The room temperature curable resin composition of claim 1, comprising
   (A) 100 parts by weight of an organopolymer having both of the molecular chain blocked with a silanol group and/or a hydrolyzable silyl group,
   (B) 0.1 to 30 parts by weight of a hydrolyzable (organo) silane compound and/or a partial hydrolytic condensate thereof,
   (C) 0.001 to 20 parts by weight of a curing catalyst, and
   (D) 0.01 to 10 parts by weight of an organosilicon compound having the average structural formula (3).

3. The room temperature curable resin composition of claim 2, further comprising one or more components per 100 parts by weight of the component (A) selected from
   (E) 1 to 1,000 parts by weight of a filler,
   (F) 0.1 to 30 parts by weight of an adhesion promoter other than the component (B), and
   (G) 1 to 1,000 parts by weight of a plasticizer.

4. A coating agent comprising the room temperature curable resin composition of claim 1.

5. An adhesive agent comprising the room temperature curable resin composition of claim 1.

6. A sealing agent comprising the room temperature curable resin composition of claim 1.

7. An article comprising a coating layer including a cured product of the room temperature curable resin composition of claim 1.

8. An article adhered and/or sealed with a cured product of the room temperature curable resin composition of claim 1.

* * * * *